US012628930B2

(12) United States Patent
Li et al.

(10) Patent No.: US 12,628,930 B2
(45) Date of Patent: May 19, 2026

(54) TELESCOPIC SUPPORT AND HAIR DRYER DEVICE USING THE TELESCOPIC SUPPORT

(71) Applicant: Heng Yi Technology Company Limited, Zhaoqing (CN)

(72) Inventors: Liangqing Li, Zhaoqing (CN); Xiaobing Wang, Zhaoqing (CN)

(73) Assignee: Heng Yi Technology Company Limited, Zhaoqing (CN)

( * ) Notice: Subject to any disclaimer, the term of this patent is extended or adjusted under 35 U.S.C. 154(b) by 108 days.

(21) Appl. No.: 18/733,684

(22) Filed: Jun. 4, 2024

(65) Prior Publication Data

US 2024/0315418 A1      Sep. 26, 2024

Related U.S. Application Data

(63) Continuation of application No. PCT/CN2020/131786, filed on Nov. 26, 2020.

(30) Foreign Application Priority Data

Nov. 16, 2020     (CN) .......................... 202011279527.4

(51) Int. Cl.
*A45D 20/12*          (2006.01)
*F16M 11/04*          (2006.01)
*F16M 11/28*          (2006.01)
(52) U.S. Cl.
CPC ........... *A45D 20/12* (2013.01); *F16M 11/041* (2013.01); *F16M 11/28* (2013.01); *A45D 2020/126* (2013.01)

(58) Field of Classification Search
CPC ............. A45D 20/12; A45D 2020/126; F16M 11/041; F16M 11/28
See application file for complete search history.

(56) References Cited

U.S. PATENT DOCUMENTS

| | | | | |
|---|---|---|---|---|
| 859,233 | A | * | 7/1907 | Lane ..................... E04H 12/182 |
| | | | | 248/404 |
| 2,750,141 | A | * | 6/1956 | Tobias ................. F16M 11/245 |
| | | | | 248/414 |

(Continued)

FOREIGN PATENT DOCUMENTS

| | | |
|---|---|---|
| CN | 204420519 U | 6/2015 |
| CN | 205510173 U | 8/2016 |

(Continued)

*Primary Examiner* — Nkeisha Smith
(74) *Attorney, Agent, or Firm* — Westbridge IP LLC

(57) ABSTRACT

A telescopic support includes a lower step sleeve and an upper step sleeve. The lower step sleeve has an inner sliding guide extending longitudinally in its inner surface and an inner-diameter adapter positioned on its inner surface and at its upper end. The upper step sleeve has an outer sliding guide extending longitudinally in its outer surface and an outer-diameter adapter positioned on its outer surface and at its lower end. The upper step sleeve is slidably received in the lower step sleeve. The inner sliding guide and the outer sliding guide are engageable with each other to enable a linear sliding movement between the lower step sleeve and the upper step sleeve. The inner-diameter adapter and the outer-diameter adapter are lockable with each other in a manner of longitudinal snap fit when the upper step sleeve is extended to its outermost position from the lower step sleeve.

6 Claims, 3 Drawing Sheets

(56)                References Cited

U.S. PATENT DOCUMENTS

| | | | | |
|---|---|---|---|---|
| 2,841,634 A * | 7/1958 | Kimball | ............... | E04H 12/182 |
| | | | | 174/45 R |
| 3,835,486 A * | 9/1974 | Benoit | ............... | A61M 5/1415 |
| | | | | 5/503.1 |
| 4,325,157 A * | 4/1982 | Balint | ...................... | B25G 1/04 |
| | | | | 15/230.11 |
| 4,671,479 A * | 6/1987 | Johnson | ............... | F16M 11/242 |
| | | | | 248/188.7 |
| 5,385,323 A * | 1/1995 | Garelick | ............... | F16B 7/1472 |
| | | | | 403/109.5 |
| 5,540,017 A * | 7/1996 | Eilam | ..................... | E04H 12/32 |
| | | | | 52/118 |
| 5,791,805 A * | 8/1998 | Lynch | ................... | F16B 7/1454 |
| | | | | 403/374.1 |
| 7,774,901 B1 * | 8/2010 | Huang | ................. | A01G 3/0251 |
| | | | | 16/113.1 |
| 7,802,340 B2 * | 9/2010 | Knopow | .................. | B25G 3/18 |
| | | | | 15/229.8 |
| 9,127,706 B2 * | 9/2015 | Leibfried | ............... | F16B 31/02 |
| 9,744,662 B1 * | 8/2017 | Henry | ..................... | B25G 1/04 |
| 9,868,042 B1 * | 1/2018 | Leonard | ................ | F16M 11/28 |
| 9,891,504 B2 * | 2/2018 | Fromm | ............... | G03B 17/563 |
| 11,744,354 B2 * | 9/2023 | Xu | ........................ | F16M 11/28 |
| | | | | 294/137 |

| | | | | |
|---|---|---|---|---|
| 12,326,653 B2 * | 6/2025 | Liu | ....................... | G03B 17/561 |
| 2008/0016712 A1 * | 1/2008 | Van | ........................ | F16M 11/18 |
| | | | | 34/283 |
| 2008/0315058 A1 * | 12/2008 | Zarpellon | ............. | F16M 11/28 |
| | | | | 248/410 |
| 2010/0192385 A1 * | 8/2010 | Pittau | ................... | A01G 3/0255 |
| | | | | 30/249 |
| 2013/0068579 A1 * | 3/2013 | Mathieu | ............... | A45C 13/262 |
| | | | | 190/115 |
| 2014/0218936 A1 * | 8/2014 | Mahling | ................. | F21V 17/04 |
| | | | | 362/418 |
| 2015/0159801 A1 * | 6/2015 | Oda | ..................... | F16M 11/046 |
| | | | | 248/125.2 |
| 2024/0102606 A1 * | 3/2024 | Follis | .................... | F16M 13/02 |
| 2024/0392804 A1 * | 11/2024 | Bao | ........................ | F04D 29/522 |

FOREIGN PATENT DOCUMENTS

| | | | |
|---|---|---|---|
| CN | 205812121 U | 12/2016 | |
| CN | 206190789 U | 5/2017 | |
| CN | 206429839 U | 8/2017 | |
| CN | 207162057 U | 3/2018 | |
| CN | 208723975 U | 4/2019 | |
| CN | 111227476 A | 6/2020 | |
| WO | 2016183655 A1 | 11/2016 | |

* cited by examiner

TELESCOPIC SUPPORT AND HAIR DRYER DEVICE USING THE TELESCOPIC SUPPORT

CROSS-REFERENCE TO RELATED APPLICATIONS

This application is a continuation of International Application No. PCT/CN2020/131786, filed on Nov. 26, 2020, which claims priority to Chinese Patent Application No. 202011279527.4, filed on Nov. 16, 2020. Both of the aforementioned applications are incorporated herein by reference in their entireties.

TECHNICAL FIELD

The present application generally relates to a telescopic support.

BACKGROUND

Telescopic supports with telescopic rod devices are quite popular nowadays, commonly used as camera supports, selfie sticks, etc. Reference can be made, for example, to Chinese Patent Publications: CN208723975U, CN207162057U, CN206429839U, CN206190789U, CN205812121U, CN204420519U, CN205510173U, and International Application Publication WO2016183655A1, etc. These telescopic rod devices generally use the friction between adjacent telescopic sleeves for their positioning in extended states, thus usually suitable only for low load-bearing due to out of positions easily caused by accidental sliding movement therebetween.

SUMMARY

An object of the present application is to provide a telescopic support, which can be locked conveniently and safely in a telescopic state.

According to an aspect of the present application, there is provided a telescopic support at least comprising:

a lower step sleeve having an inner sliding guide extending longitudinally in an inner surface of the lower step sleeve and an inner-diameter adapter positioned on the inner surface, and at an upper end, of the lower step sleeve; and an upper step sleeve having an outer sliding guide extending longitudinally in an outer surface of the upper step sleeve and an outer-diameter adapter positioned on the outer surface, and at a lower end, of the upper step sleeve, wherein the upper step sleeve is slidably received in the lower step sleeve; the inner sliding guide of the lower step sleeve and the outer sliding guide of the upper step sleeve are engageable with each other to enable a linear sliding movement between the lower step sleeve and the upper step sleeve; and the inner-diameter adapter of the lower step sleeve and the outer-diameter adapter of the upper step sleeve are lockable with each other in a manner of longitudinal snap fit when the upper step sleeve is extended to its outermost position from the lower step sleeve.

According to the present application, the upper step sleeve may, when acting as an uppermost step sleeve, be further provided with a connector. In addition, the lower step sleeve may, when acting as a lowermost step sleeve, be further provided with a stand. As needed, there may be one or more additional step sleeves with similar structures.

According to another aspect of the present application, there is also provided a hair dryer device comprising the above-mentioned telescopic support and a hair dryer which is detachably connected to a connector provided on an uppermost sleeve of the telescopic support.

According to the telescopic support of the present application, adjacent step sleeves thereof can be easily aligned, snapped into each other in a fast and labor-saving way and needless in increase of radial dimension. The telescopic support of the present application thus has an excellent load-bearing performance and is particularly suitable for supporting heavy items such as hair dryers.

DETAILED DESCRIPTION OF THE EMBODIMENTS

Figure 1:
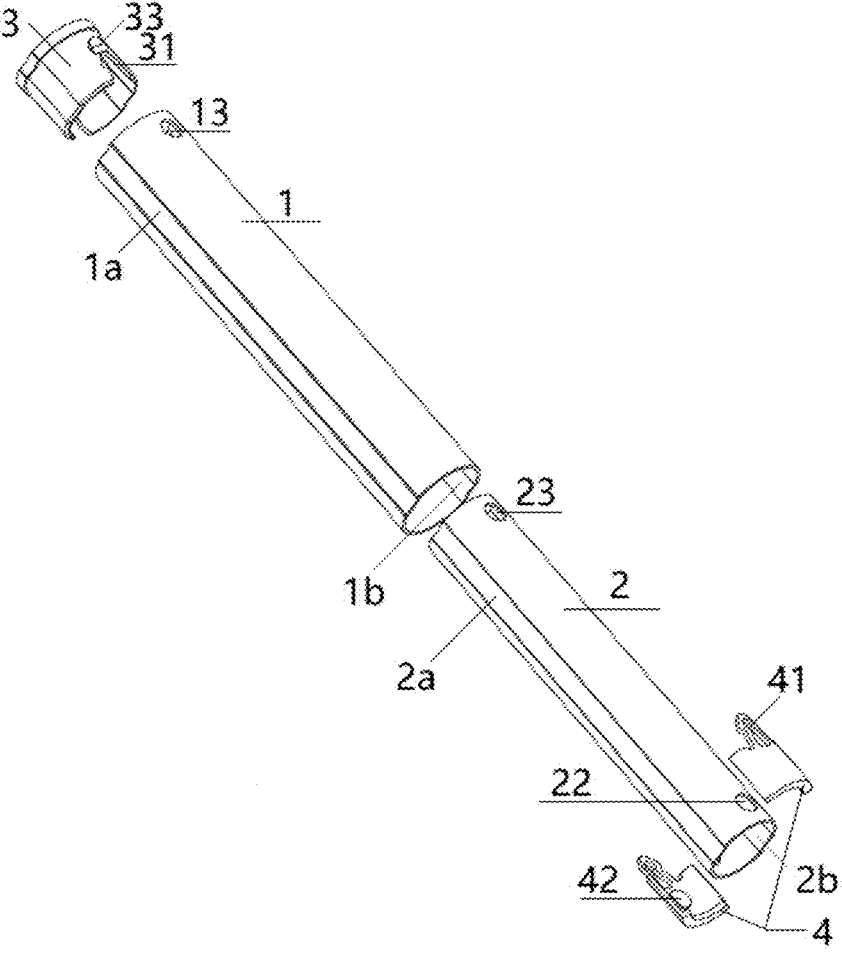
FIG. 1 shows a schematic structure of a telescopic rod device according to the present application in a perspective view.

The present application will be described in further details below based on embodiments with reference to the drawing. It should be understood by those skilled in the art that the embodiments and the drawing are only for better understanding of the present application and are not intended to be limiting.

FIG. 1 schematically shows a telescopic rod device of the telescopic support according to the present application, which includes a lower step sleeve (outer sleeve) 1 and an upper step sleeve (inner sleeve) 2 both made of light metal such as aluminum alloy. For the sake of brevity, FIG. 1 only shows two step sleeves, but generally in practice the telescopic rod device can further include more intermediate step sleeves with similar structures.

The lower step sleeve 1 has longitudinal or axial linear runners (sliding grooves) la in its outer surface, and longitudinal or axial linear ribs (sliding bars) 1b in its inner surface. Although two runners 1a in symmetry and two ribs 1b in symmetry are shown, they may each be provided in a single one. In addition, the runners 1a can be omitted when the lower step sleeve 1 is used as a lowermost step sleeve or bottom sleeve.

Similarly, the upper step sleeve 2 has longitudinal or axial linear runners 2a in its outer surface, and longitudinal or axial linear ribs 2b in its inner surface. Although two runners 2a in symmetry and two ribs 2b in symmetry are shown, they may each be provided in a single one. In addition, the ribs 2b can be omitted when the upper step sleeve 2 is used as an uppermost step sleeve or top sleeve.

The upper step sleeve 2 has an outer diameter smaller than an inner diameter of the lower step sleeve 1, so that the upper step sleeve 2 can be received in the lower step sleeve 1. The rib 1b of the lower step sleeve 1 engages with the runner 2a of the upper step sleeve 2 as a sliding guide, so that the upper step sleeve 2 can slide linearly relative to the lower step sleeve 1 upon push or pull action.

The lower step sleeve 1 is shown with an insert bushing 3 positioned at or near its upper end. The insert bushing 3 is a single piece formed by injection molding, inserted and fixed in the lower step sleeve 1 in close contact with its inner surface. The insert bushing 3 are shown with two snap-fit female portions 31 symmetrically formed in its peripheral wall, each having a longitudinally or axially tapering notched contour. The tapering notched contour of the snap-fit female portion 31 ends in the vicinity of a positioning protrusion 33 formed radially outward on the peripheral wall of the bush 3. The positioning protrusion 33 is configured to fit into or snap into a positioning hole 13 formed in the peripheral wall of the lower step sleeve 1.

As shown, the upper step sleeve 2 is provided with two embracing bushing pieces 4 at or near its lower end, which are in symmetry coated on or attached to the outer surface of the upper step sleeve 2. Each embracing bushing piece 4 is injection molded as a single piece and formed with a snap-fit male portion 41 having a longitudinal or axial arrow-shaped insertion profile. A positioning protrusion 42 is formed radially inward on the inner surface of the snap-fit male portion 41. The positioning protrusion 42 is configured to fit into or snap into a positioning hole 22 formed in the peripheral wall of the upper step sleeve 2.

The insert bushing 3 of the lower step sleeve 1 and the embracing bushing pieces 4 of the upper step sleeve 2 generally have a same or similar uniform wall thickness, and are each configured as diameter adapters, so that the minimum inner diameter of the lower step sleeve 1 at the insert bushing 3 is substantially same as the maximum outer diameter of the upper step sleeve at the embracing bushing pieces 4, resulting thus in a stop for positioning.

Although not specifically shown, the lower step sleeve 1 can similarly be provided with two embracing bushing pieces at or near its lower end, and the upper step sleeve 2 can similarly be provided with an insert bushing (positioned through a positioning hole 23) at or near its upper end, so that they can be configured also as intermediate step sleeves respectively.

The arrow-shaped insertion profiles of the two embracing bushing pieces 4 on the outer surface of the upper step sleeve 2 correspond to, and can thus adaptively and resiliently be longitudinally received in, the two tapering notched contours of the insert bushing 3 inserted in the lower step sleeve 1 respectively. Such a longitudinal snap-fit engagement is easy in alignment, fast and labor-saving in snap fit, needless in increase of radial dimension, and excellent in load-bearing performance.

Figure 2:
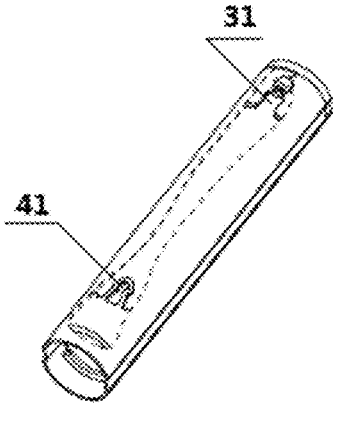
FIGS. 2-4 illustratively show the telescopic rod device according to the present application in different telescopic states.

The telescopic rod device shown in FIG. 2 is in a fully folded or retracted state, wherein the upper step sleeve 2 is completely retracted in the lower step sleeve 1.

Figure 3:
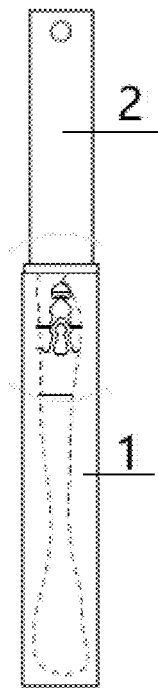

The telescopic rod device shown in FIG. 3 is in an incompletely extended state, wherein the snap-fit male portions 41 of the embracing bushing pieces 4 of the upper bushing 2 are just in contact with the snap-fit female portions 31 of the insert bushing 3 of the lower step sleeve 1.

Figure 4:
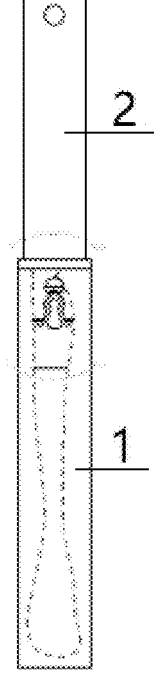

The telescopic rod device shown in FIG. 4 is in a fully extended state, wherein the arrow-shaped insertion profiles of the snap-fit male portions 41 of the embracing bushing pieces 4 of the upper step sleeve 2 is entirely inserted or snapped into the tapering notched contours of the snap-fit female portions 31 of the insert bushing 3 of the lower step sleeve 1.

A lowermost step sleeve (for example, the lower step sleeve 1 as shown) of the telescopic rod device of the present application can be configured to connect a stand such as an expandable tripod, and an uppermost step sleeve (for example, the upper step sleeve 2 as shown) can be configured to connect a holder or a connector for holding heavy items such as a hair dryer as described below.

Figure 5:
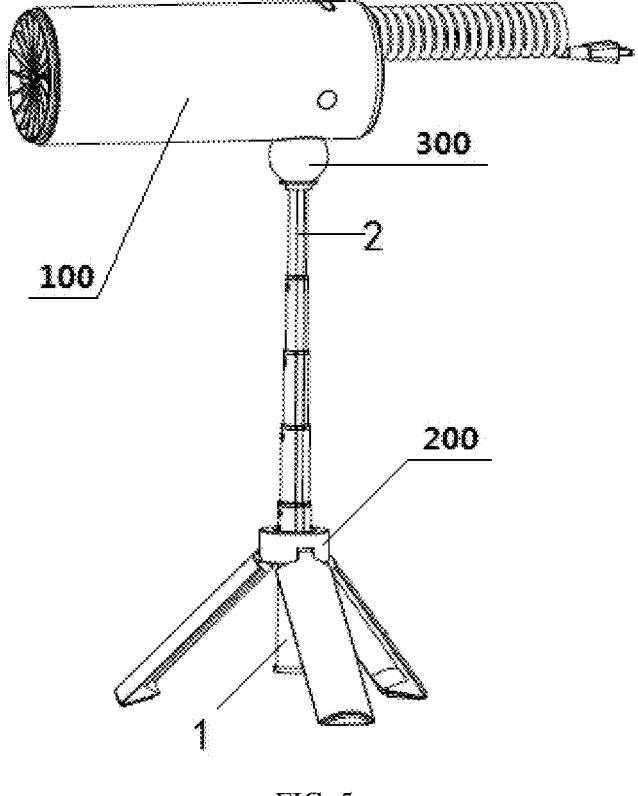
FIG. 5 shows a schematic structure of a hair dryer device according to the present application in a perspective view, with its support in a maximum extension state.
Figure 6:
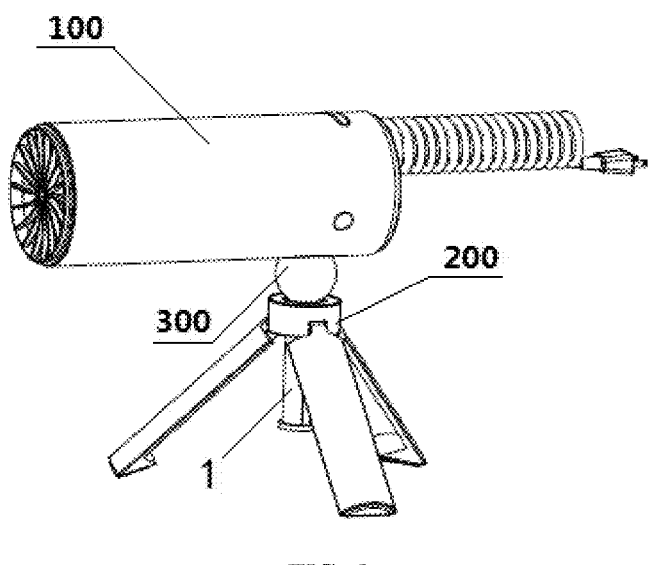
FIG. 6 shows a schematic structure of the hair dryer device according to the present application in a perspective view, with its support in a minimum retraction state.

Referring to FIG. 5 and FIG. 6 which show a hair dryer device including a hair dryer 100 and a telescopic support 200 as well as a connector 300 for their quick connection. The connector 300 can be, for example, a magnetic ball head fixedly disposed on the upper end of the telescopic support 200, which will result in a strong attraction to, for example, an iron housing of the hair dryer 100 for its connection or holding.

A telescopic support 200 in the form of a multi-step telescopic rod device is shown in FIG. 5 and FIG. 6. The telescopic support 200 consisting of 5-step sleeves is shown in a maximum extension state in FIG. 5, and in a minimum retraction state while in FIG. 6.

The telescopic support 200 can further be conveniently accommodated in the housing of the hair dryer 100 for achieving a neat configuration in a non-use state. Such a hair dryer can be referred, for example, to Chinese Patent Application Publication CN111227476A which is hereby incorporated by reference in its entirety.

What is claimed is:

1. A telescopic support comprising:
   a lower step sleeve having an inner sliding guide extending longitudinally in an inner surface of the lower step sleeve and an inner-diameter adapter positioned on the inner surface, and at an upper end, of the lower step sleeve; and
   an upper step sleeve having an outer sliding guide extending longitudinally in an outer surface of the upper step sleeve and an outer-diameter adapter positioned on the outer surface, and at a lower end, of the upper step sleeve, wherein
   the upper step sleeve is slidably received in the lower step sleeve;
   the inner sliding guide of the lower step sleeve and the outer sliding guide of the upper step sleeve are engageable with each other to enable a linear sliding movement between the lower step sleeve and the upper step sleeve;
   the inner-diameter adapter of the lower step sleeve and the outer-diameter adapter of the upper step sleeve are lockable with each other in a manner of longitudinal snap fit when the upper step sleeve is extended to its outermost position from the lower step sleeve;
   the inner-diameter adapter of the lower step sleeve is an insert bushing in contact with the inner surface of the lower step sleeve, and the outer-diameter adapter of the upper step sleeve comprises two embracing bushing pieces in symmetry disposed on, and in contact with, the outer surface of the upper step sleeve; and
   each embracing bushing piece is provided with a positioning protrusion protruding radially inward into a positioning hole provided correspondingly on the outer surface of the upper step sleeve; and the insert bushing is provided with a positioning protrusion protruding radially outward into a positioning hole provided correspondingly on the inner surface of the lower step sleeve.

2. The telescopic support of claim 1, wherein the outer sliding guide of the upper step sleeve is a linear runner extending a whole length of the upper step sleeve and the inner sliding guide of the lower step sleeve is a linear rib extending a whole length of the lower step sleeve and slidably received in the linear runner.

3. The telescopic support of claim 1, wherein the outer-diameter adapter of the upper step sleeve has an insertion profile, and the inner-diameter adapter of the lower step sleeve has a receiving contour for longitudinally receiving and thus resiliently locking therein the insertion profile of the outer-diameter adapter of the upper step sleeve.

4. The telescopic support of claim 3, wherein the inner-diameter adapter of the lower step sleeve and the outer-diameter adapter of the upper step sleeve have a same or similar uniform thickness.

5. The telescopic support of claim 1, wherein the upper step sleeve, when acting as an uppermost step sleeve, is further provided with a connector.

6. A hair dryer device comprising the telescopic support of claim 5 and a hair dryer which is detachably connected to the connector of the uppermost step sleeve of the telescopic support.

\* \* \* \* \*